R. P. JACKSON.
CHARGING SYSTEM FOR ELECTROLYTIC LIGHTNING ARRESTERS.
APPLICATION FILED JULY 30, 1914. RENEWED NOV. 13, 1915.
1,186,791.
Patented June 13, 1916.
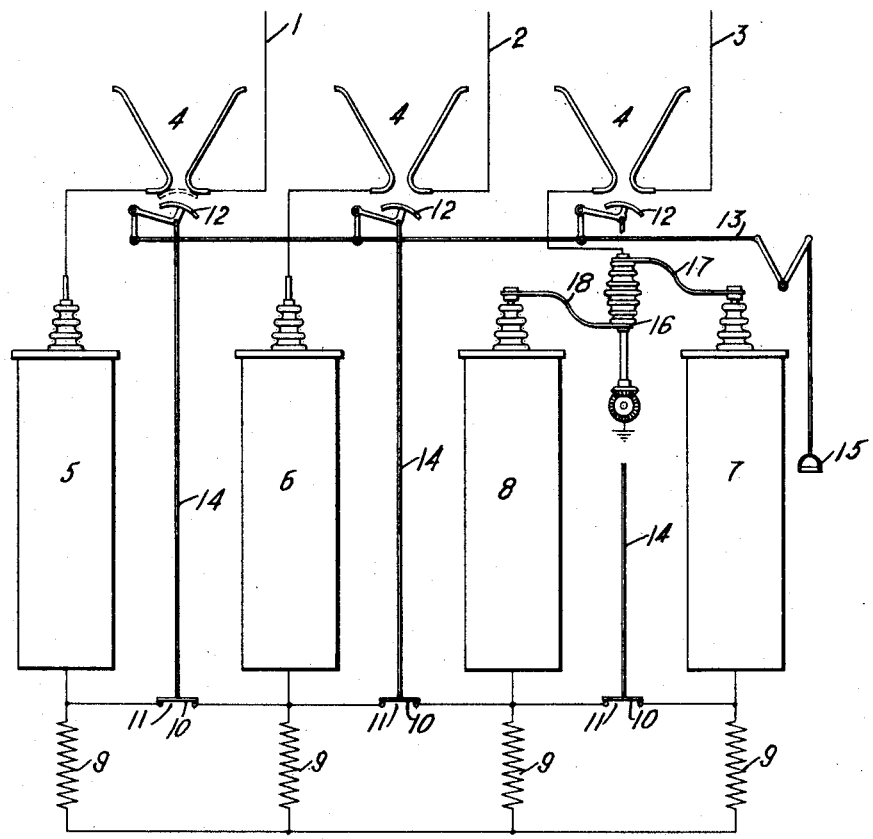
WITNESSES:
Fred. A. Lind.
Geo. W. Hansen.
INVENTOR
Ray P. Jackson
BY
ATTORNEY

UNITED STATES PATENT OFFICE.

RAY P. JACKSON, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

CHARGING SYSTEM FOR ELECTROLYTIC LIGHTNING-ARRESTERS.

1,186,791. Specification of Letters Patent. Patented June 13, 1916.

Application filed July 30, 1914, Serial No. 854,109. Renewed November 13, 1915. Serial No. 61,446.

*To all whom it may concern:*

Be it known that I, RAY P. JACKSON, a citizen of the United States, and a resident of Edgewood Park, in the county of Allegheny and State of Pennsylvania, have invented a new and useful Improvement in Charging Systems for Electrolytic Lightning-Arresters, of which the following is a specification.

My invention relates to electrolytic lightning arresters, and it has special reference to arresters in which electrodes made of a film-forming metal, such as aluminum, are immersed in a suitable electrolyte.

My invention refers particularly to charging systems for lightning arresters of the above-mentioned type in which resistors are automatically inserted in series circuit with the arresters when spark gap members connected between the arresters and line conductors are bridged to perform the charging operation.

It is well known that a cell of the electrolytic condenser type must be intermittently charged to reform the high-resistance films upon the electrodes comprising the cell. Initially, these films are produced on the film-forming metal electrodes that are preferably made of aluminum by a "forming" process which consists essentially in submerging the electrodes in a suitable electrolyte and then subjecting them to the prolonged action of an electric current. The films once having been formed, gradually deteriorate and weaken after the arrester has been assembled, thereby necessitating intermittent charging operations in order to maintain the high-resistance quality of the films. Sometimes the films become so weakened that, when the arrester is directly connected to a line conductor, it may constitute more or less of a short circuit which may create very undesirable and dangerous surges upon the transmission line.

To obviate the occurrence of undesirable surges at the time of charging, non-inductive resistors have been inserted in series with an electrolytic lightning arrester to cut down the high initial current flow. The value of the resistance need not be very great because it does not hinder the passage to ground of the ordinary disturbances occurring upon the transmission line. However, high frequency and, consequently, serious disturbances are offered objectionable impedance by reason of the resistor. Therefore, it is necessary to provide a charging system for an electrolytic lightning arrester which will limit the initial flow of the line current, and will not offer any objectionable impedance to high-frequency disturbances.

For a better understanding of the nature and the scope of my invention, reference may be had to the following description and the accompanying drawing in which the figure is a view, somewhat diagrammatic, of a charging system embodying a form of my invention.

For convenience, I have shown and described my charging system as applied to a three-phase transmission line, but it will be understood that my invention is not limited to three-phase systems. Moreover, I have shown the lightning arresters connected in multiplex relationship. Under this condition, one terminal of a cell is connected directly to each of the transmission conductors and the other terminals of the cells are electrically connected at a common or neutral point which, in turn, is connected to ground through an additional or ground cell.

Conductors 1, 2 and 3, comprising the transmission line which it is desired to protect, are connected, through substantially high resistor or horn gap members 4, to electrolytic lightning arresters 5, 6, 7 and 8, respectively. Resistors 9, which may be connected at will in series circuit with the above-mentioned electrolytic cells, limit the initial current flow at the beginning of the charging operation. It is apparent that the cells are normally disconnected from the line conductors 1, 2 and 3, and that the resistors 9 are short circuited by means of members 10 bridging air gaps 11.

As above mentioned, the electrolytic cells 5, 6, 7 and 8 must be intermittently charged to reform the high-resistance films upon the electrodes. To this end, the horn-gap members 4 are bridged by members 12 when a common link 13 is actuated by the operator. When the link 13 is moved to the right, the members 12 approach the horn-gap members 4, and the bridging members 10 are raised by means of links 14 which are pivotally connected to the link 13. When the members 10 are raised upwardly, the resistors 9 are automatically inserted in series circuit with the electrolytic cells, each cell being provided with a corresponding resistor. After the cells have been charged, the operator releases a handle 15, thereby inserting the spark gaps formed by the horn-gap members 4 between the line conductors and the electrolytic cells. At the same time, the bridging members 10 short circuit the resistors 9. The protective system comprising the electrolytic cells is now in normal position to afford the maximum protection to the transmission lines.

Inasmuch as the electrolytic cells 5, 6 and 7 may be directly connected to the conductors 1, 2 and 3, respectively, it is not difficult to pass sufficient current through these cells to charge them effectively. However, the ground cell 8, being connected between ground and the neutral point remote from the conductors 1, 2 and 3, does not receive sufficient current to insure the formation of the films upon its electrodes. To this end, the transfer switch, having blades 17 and 18, is disposed between the end cells 7 and 8. The blade 17 is connected directly to the line conductor 3, and the blade 18 is connected to ground. In order to charge the cell 8, the switch 16 is rotated so that the blade 17 is connected directly to the cell 8, thereby permitting sufficient line current to flow through the cell in order to charge it properly. At the same time, the cell 7 is connected between the above-mentioned neutral or common point and ground.

While I have shown and described one embodiment of my invention, it will be understood that modifications may be made without departing from the spirit and scope of the appended claims.

I claim as my invention:

1. The combination with a line conductor, an electrolytic lightning arrester, and spaced spark-gap members inserted between the line conductor and the arrester, of a normally short-circuited resistor, and means for inserting said resistor in series circuit with the lightning arrester when said spark-gap members are bridged.

2. The combination with a line conductor, an electrolytic lightning arrester, and spaced spark-gap members inserted between the line conductor and the arrester, of means for inserting a resistor of substantially low resistance in series circuit with said arrester at the time when the spark-gap members are bridged.

3. A charging system for electrolytic lightning arresters comprising a line conductor, an electrolytic lightning arrester, spaced spark-gap members, a normally shunted resistor, all said elements being connected in series-circuit relationship, and means for removing the shunt from said resistor when the spark-gap members are bridged.

4. A charging system for an electrolytic lightning arrester comprising a line conductor, an electrolytic lightning arrester, a substantially high-resistance element, a normally shunted substantially low-resistance element, all of said members being connected in series-circuit relationship, means for removing the shunt from said low-resistance element, and simultaneously-operated means for shunting said high-resistance element.

5. The combination with a line conductor, an electrolytic cell, and spaced spark-gap members inserted between the line conductor and the arrester, of a normally short-circuited resistor, and means for automatically inserting said resistor in series circuit with the cell when said spark-gap members are electrically connected to each other.

6. A charging system for an electrolytic lightning arrester comprising a line conductor, an electrolytic cell, a substantially high-resistance element, a normally shunted substantially low-resistance element, all of said members being connected in series circuit relationship, and means for shunting said high-resistance element when the shunt from said low-resistance element is removed.

7. A charging system for an electrolytic lightning arrester comprising a line conductor, an electrolytic lightning arrester, a substantially high-resistance element, a substantially low-resistance element which is normally shunted by a low-resistance path, and means for varying the circuit connections of said high-resistance and substantially low-resistance elements.

In testimony whereof, I have hereunto subscribed my name this 22nd day of July, 1914.

RAY P. JACKSON.

Witnesses:
  GOLDIE E. McGEE,
  B. B. HINES.